(12) United States Patent
Shimoyama et al.

(10) Patent No.: US 7,081,917 B2
(45) Date of Patent: Jul. 25, 2006

(54) AUTOMATIC COLLIMATION SURVEYING APPARATUS HAVING IMAGE PICK-UP DEVICE

(75) Inventors: Yuuji Shimoyama, Kanagawa (JP); Kunitoshi Ogawa, Kanagawa (JP); Gen Kuriyama, Kanagawa (JP)

(73) Assignee: Sokkoia Company Limited, Kanagawa (JP)

( * ) Notice: Subject to any disclaimer, the term of this patent is extended or adjusted under 35 U.S.C. 154(b) by 714 days.

(21) Appl. No.: 10/214,457

(22) Filed: Aug. 8, 2002

(65) Prior Publication Data

US 2003/0048355 A1    Mar. 13, 2003

(30) Foreign Application Priority Data

Aug. 10, 2001  (JP)  .............................. 2001-244068
Feb. 14, 2002  (JP)  .............................. 2002-037274

(51) Int. Cl.
*H04N 7/18*  (2006.01)
*H04N 9/47*  (2006.01)

(52) U.S. Cl. ...................................................... 348/135
(58) Field of Classification Search ...................... None
See application file for complete search history.

(56) References Cited

U.S. PATENT DOCUMENTS

| | | | |
|---|---|---|---|
| 5,393,969 A * | 2/1995 | Ohsawa | 250/201.8 |
| 6,034,722 A | 3/2000 | Viney et al. | |
| 6,137,569 A * | 10/2000 | Sasaki et al. | 356/153 |
| 6,249,338 B1 * | 6/2001 | Ohtomo et al. | 356/4.08 |
| 6,473,166 B1 * | 10/2002 | Ohishi et al. | 356/141.1 |
| 2001/0045534 A1 * | 11/2001 | Kimura | 250/559.38 |
| 2003/0048438 A1 | 3/2003 | Kawamura et al. | |

FOREIGN PATENT DOCUMENTS

| | | |
|---|---|---|
| JP | 6-94417 | 4/1994 |
| JP | 9-167287 | 6/1997 |
| JP | 11-14357 | 1/1999 |
| JP | 11-325883 | 11/1999 |
| JP | 2000-275044 | 10/2000 |
| JP | 2001-69496 | 3/2001 |
| JP | 2001-296124 | 10/2001 |
| JP | 3626141 B2 | 12/2004 |

* cited by examiner

*Primary Examiner*—Nhon Diep
(74) *Attorney, Agent, or Firm*—Thomas W. Cole; Nixon Peabody LLP

(57) ABSTRACT

An automatic collimation surveying apparatus is provided with a collimation camera optical system (47) of a high magnification ratio; a wide-angle CCD camera optical system (89) having a wide field of view; a touch-panel display (64) for displaying an image picked up by both CCD camera optical systems; an image processing unit (60) for discriminating points of measurement from the above-described image; a touch-pen for pointing out points of measurement on the above-described image; and an automatic collimation unit (69) for automatically collimating the pointed-out points of measurement. In addition, illumination light from light source (80) is concurrently used as collimation light and is aligned so as to be emitted along the collimation axis (O) of a collimation camera optical system. The surveying apparatus can be remotely controlled from a measurement controller such as a peripheral personal computer. The surveying apparatus allows a number of point-of-measurement positions to be efficiently measured on a large-scaled structure by a single operator.

9 Claims, 14 Drawing Sheets

PRIIOR ART

AUTOMATIC COLLIMATION SURVEYING APPARATUS HAVING IMAGE PICK-UP DEVICE

FIELD OF THE INVENTION

The present invention relates to a surveying apparatus provided with a pick-up device such as a CCD camera, and an image processing unit, and in particular to a surveying apparatus suited to measurement of respective positions of a large-scaled structure such as a bridge, a ship, or a tunnel.

BACKGROUND OF THE INVENTION

Japanese Unexamined Patent Publication No. Hei-11-325883 discloses a total surveying station provided with an image pick-up device has existed. The telescope of the total station disclosed by the Publication is provided, as shown in FIG. 18, with an object lens 11, a focusing lens 12, a holoprism 13 to make an image erect, a beam splitter 16, a reticle 14, and eyepiece lens 15 on the optical axis, and is further provided with a CCD camera 17 for receiving light reflected by the beam splitter 16 in an orthogonal direction, and an optical system 18 for a range finder, which is disposed rearward of the object lens 1. An image picked up by the CCD CAMERA 17 is stored together with the surveying results (horizontal angle, vertical angle, distance, date and hour, weather, etc.), in a memory medium via an image compression device (not illustrated). Also, as shown in FIG. 19, the total station 31 is provided with a monitor 32 for displaying an image picked up by the CCD camera 17, surveying results, alarm, etc., and ten keys 33 for inputting data such as data and hour, weather, etc. The image and surveying results, which are stored in a memory medium, are inputted into a personal computer, and data analyses are carried out by using the images picked up in a plurality of directions and the surveying results, wherein positions of respective points on the images are obtained.

Japanese Unexamined Patent Publication No. 2000-275044 discloses such a total station provided with an image pick-up device and an image processing unit. The total station disclosed by the Publication constitutes, as shown in FIG. 20, a mensuration portion 10 in which a CCD camera 17 is attached to the eyepiece portion of a telescope of a remote control type total station 31, the CCD camera 17, image processing unit 13a, and calculation control unit 13b are connected to each other by a cable 10a, and the image processing unit 13a, calculation control unit 13b and a wireless communications unit 4 are connected to each other by a cable 10b. Further, this type of station is provided with an operation portion 20 in which a handy computer 21 and a wireless communications unit 22 are connected by a cable 22a in order to remotely control the total station 31.

When design coordinates stored by the handy computer 21 are transmitted to the total station 31 via the wireless communications units 22 and 4 with respect to the target placed on an object to be measured, the total station 31 carries out automatic collimation with respect to the design coordinates, and focusing is made on the design coordinates. Image signals, which are outputted from the CCD camera 17, and position adjusting data, which are calculated by the calculation control unit 13b, are transmitted to the handy computer 21 via the wireless communications units 4 and 22, and are displayed on the display 21a thereof. Therefore, an operator can understand a slip of the target from the design coordinates by observing the display 21a.

However, in the surveying apparatus disclosed by Japanese Unexamined Patent Publication No. Hei-11-325883, which is shown in FIG. 18 and FIG. 19, since positions of respective points of measurement of a large-scaled structure are calculated on the basis of images and surveying data, it is necessary to provide images and surveying data which are obtained in a plurality of directions. Consequently, there is a problem in that work efficiency is not satisfactory since, after images and surveying data are obtained at all of the plurality of points, positions of the respective points of measurement of a large-scaled structure are obtained, by using a personal computer, on the basis of the image and surveying data that are stored in a memory medium. Furthermore, since it is necessary for an operator to manually carry out collimation with respect to the points of measurement, there is another problem in that the work load applied on the operator is heavy and efficient measurement can not be carried out.

Also, in the surveying apparatus disclosed in Japanese Unexamined Patent Publication No. 2000-275044, which is shown in FIG. 20, although an operator at the side of an object to be measured is able to remotely control a surveying apparatus while observing the display 21a, measurements must be manually carried out one by one with respect to respective points of measurement while making the respective points of measurement coincident on the display 21a in order to measure the respective points of measurement of a large-scaled structure. Therefore, the work load applied to the operator is heavy, and no efficient measurement can be carried out.

In addition, it becomes necessary to provide an image processing unit 13a, a calculation control unit 13b (personal computer) and communications units 4 and 22 between respective surveying apparatuses 31 and the handy computer 21, wherein there arises still another problem in that the surveying system becomes large-scaled as a whole.

A surveying apparatus that is provided with an automatic collimation unit and is able to automatically collimate a target in order to lighten the work load of an operator for collimation work is also known in the art. However, since such an automatic collimation unit only functions after its sensor catches reflection light from the target, it is necessary for the operator at least to catch a target in the vicinity of the center of a rectile line (cross-shaped lines) in the field of view of a telescope, and a work load which is almost similar to that of manual collimation is required.

In order to solve the above-described problems, it is therefore an object of the present invention to provide an automatic collimation surveying apparatus that can lighten a work load for an operator to collimate points of measurement, and at the same time is able to efficiently measure a number of points of measurement, without any heavy load with respect to an object to be measured, of a large-scaled structure, with only a single surveying apparatus and by a single operator.

SUMMARY OF THE INVENTION

In order to attain the above-described object, an automatic collimation surveying apparatus according to the first aspect of the invention is featured in that the automatic collimation surveying apparatus having an image pick-up device for picking up an object to be measured, which is held by a telescope, comprises: a display for displaying an image picked up by said image pick-up device; an image processing unit for discriminating a point of measurement from said image; point-of-measurement point-out means for pointing out the point of measurement on said image; and an automatic collimation unit for automatically collimating a pointed-out point of measurement.

The automatic collimation surveying apparatus according to the second aspect of the invention is featured, in addition to the first aspect of the invention, in that said display is a touch-panel display, and a point of measurement can be pointed out by touching the point of measurement on said image by said point-of-measurement pointing out means.

The automatic collimation surveying apparatus according to the third aspect of the invention is featured, in addition to the first or second aspect of the invention, in that the apparatus is connected to a peripheral mensuration controller provided with an image display.

The automatic collimation surveying apparatus according to the fourth aspect of the invention is featured, in addition to the first, second or third aspect of the invention, in that said automatic collimation unit includes an image pick-up device installed in said telescope, into which illumination light reflected by said point of measurement is made incident.

The automatic collimation surveying apparatus according to the fifth aspect of the invention is featured, in addition to the first, second, third or fourth aspect of the invention, in that said automatic collimation unit includes a cross-shaped line sensor installed in said telescope, into which illumination light reflected by said point of measurement is made incident.

The automatic collimation surveying apparatus according to the sixth aspect of the invention is featured, in addition to the first, second or third aspect of the invention, in that said telescope includes a collimation camera optical system of high magnification, and a wide-angle camera optical system having a wide angle of view, and said automatic collimation unit includes: a first automatic collimation device that has a pick-up device installed in said collimation camera optical system in order to pick up a target of said point of measurement, a second automatic collimation device that has a cross-shaped line sensor installed in said collimation came camera optical system, into which illumination light reflected by said point of measurement is made incident; and a spare collimation device that has a pick-up device installed in said wide-angle camera optical system in order to pick up a target of said point of measurement.

The automatic collimation surveying apparatus according to the seventh aspect of the invention is featured, in addition to any one of the first through the sixth aspects of the invention, in that an illumination unit that emits illumination light of visible light is provided on the same axis as a collimation axis.

The automatic collimation surveying apparatus according to the eighth aspect of the invention is featured, in addition to the seventh aspect of the invention, that includes a distance measuring portion for measuring a distance to an object to be measured, and an angle measuring portion for measuring an angle thereof, wherein said distance measuring portion measures a distance only when said illumination light is turned off.

The automatic collimation surveying apparatus according to the ninth aspect of the invention is featured, in addition to the seventh or eighth aspect of the invention, in that said pick-up device, said light illumination unit, and optical system of said distance measuring portion are constructed as a coaxial optical system.

The automatic collimation surveying apparatus according to the tenth aspect of the invention is featured, in addition to the seventh, eighth, or ninth aspect of the invention, in that said light illumination unit includes a light source that flashes at an appointed interval.

DETAILED DESCRIPTION OF THE PREFERRED EMBODIMENT

Figure 1:
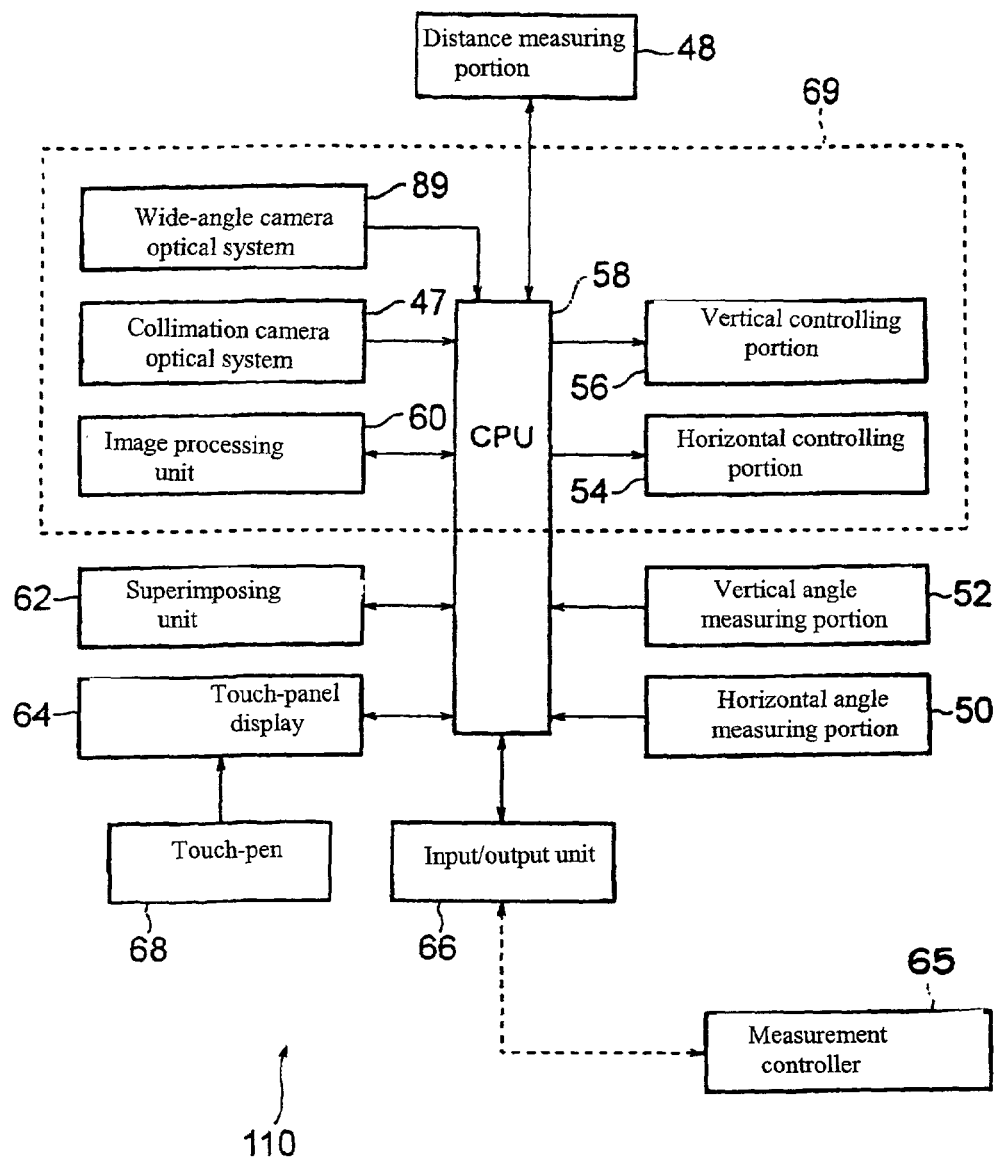
FIG. 1 is a block diagram showing the entirety of a surveying apparatus according to one embodiment of the invention.
Figure 2:
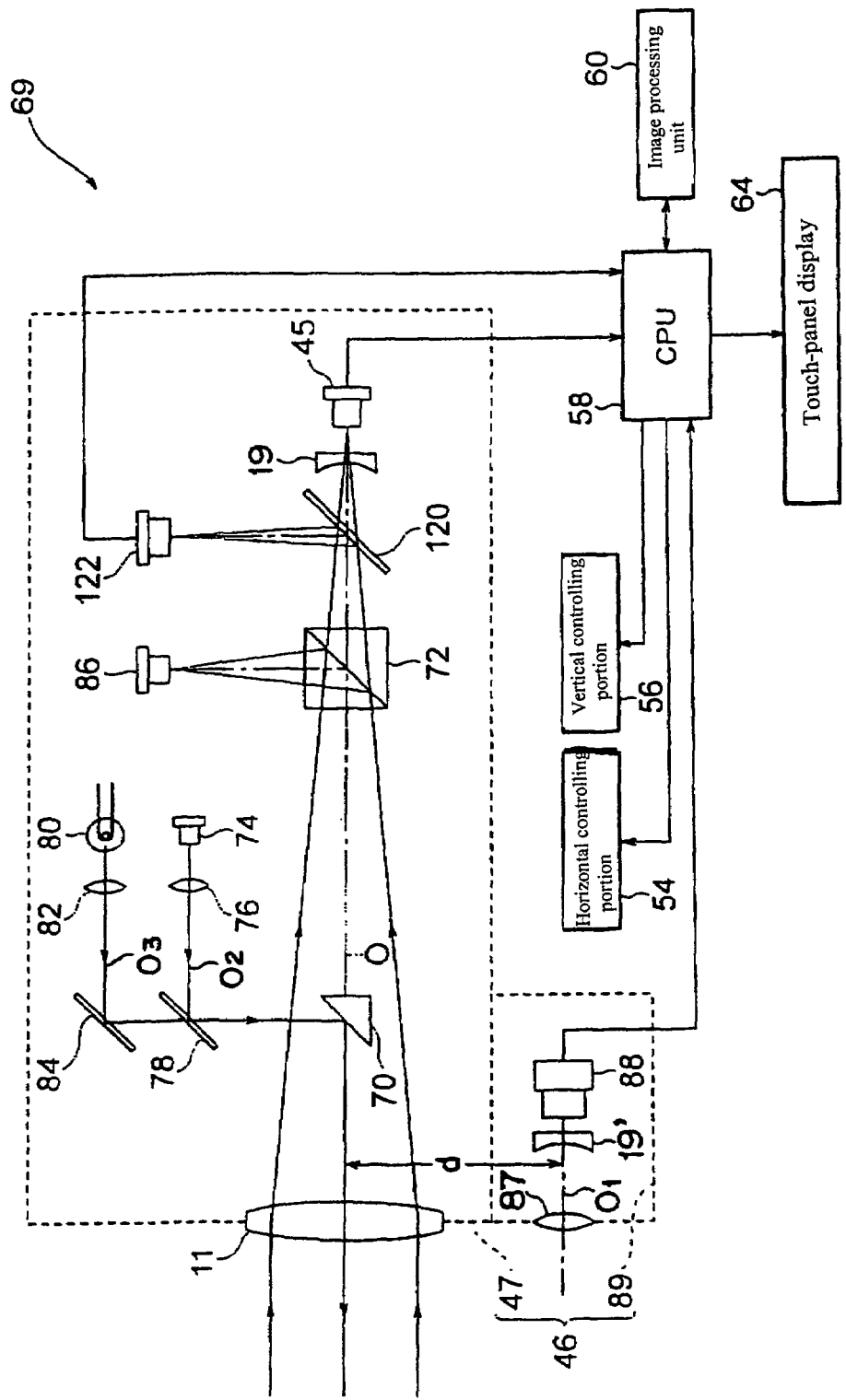
FIG. 2 is a view describing an optical system of the above-described surveying apparatus and an automatic collimation unit.
Figure 3:
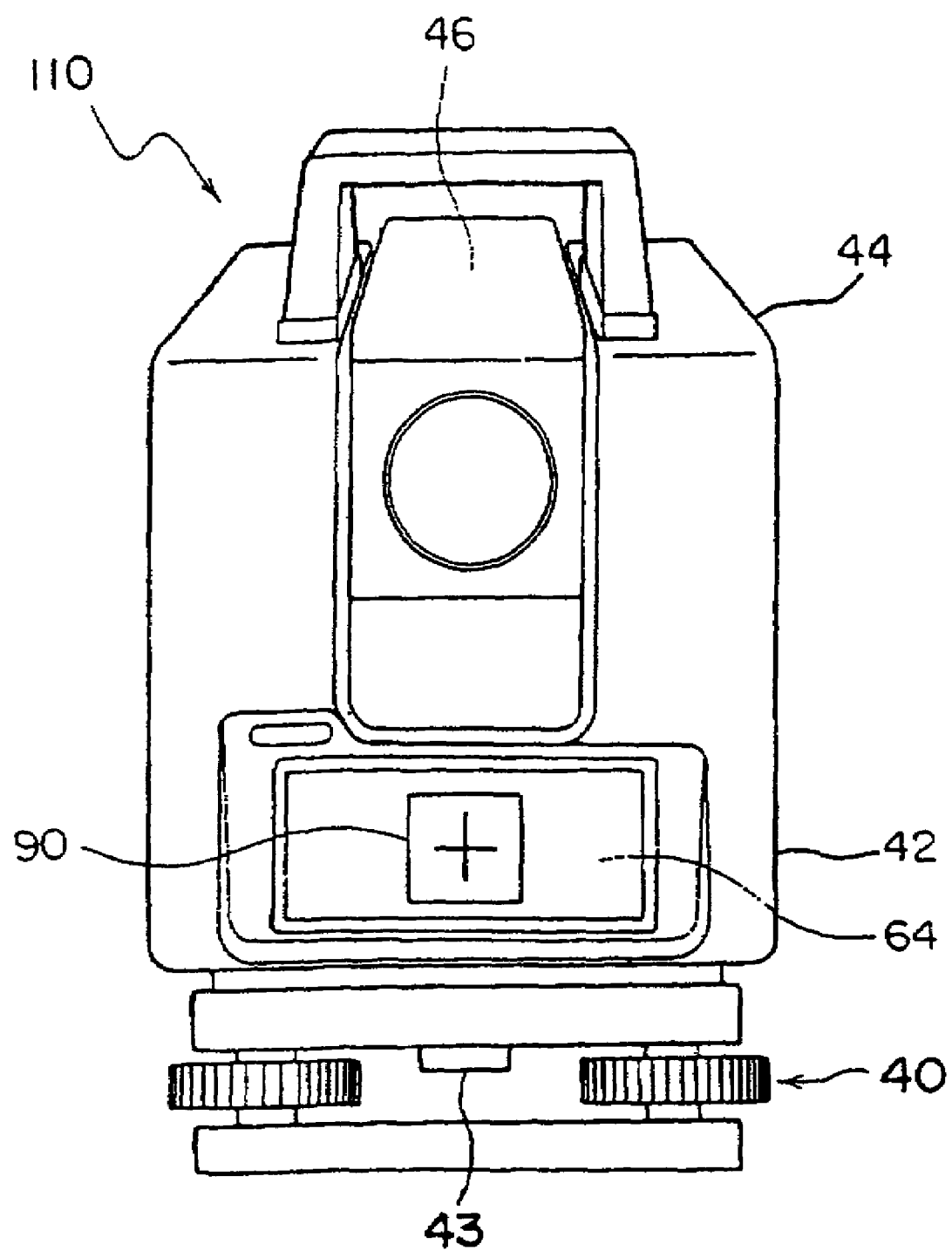
FIG. 3 is a rear view of the above-described surveying apparatus.

As shown in FIG. 1, FIG. 2 and FIG. 3, a telescope 46 of a surveying apparatus 110 according to the present embodiment is provided with, as shown in FIG. 1, FIG. 2 and FIG. 3, a wide-angle camera optical system 89 which functions as a pick-up device for picking up an object to be measured, at a wide-angle range of a low magnification ratio, in addition to a collimation camera optical system 47 which functions as a pick-up device for picking up an object to be measured at a high magnification ratio. And, in the surveying apparatus 110, as shown in FIG. 3, a horizontal rotation axis 43 is horizontally rotatably attached on a leveling-up base 40, and a telescope 46 is vertically rotatably attached between erected portions 44 erected on the horizontal rotation axis 43.

Also, as shown in FIG. 1, the surveying apparatus 110 according to the embodiment includes, as in the total station, a distance measuring portion (optical wave range finder) 48 for measuring a distance to a point of measurement; a horizontal angle measuring portion (horizontal encoder) 50 for measuring a horizontal angle of the telescope 46, a vertical angle measuring portion (vertical encoder) 52 for measuring a vertical angle of the telescope 46, a horizontal controlling portion (horizontal servomotor) 54 for controlling the horizontal angle of the telescope 46, a vertical controlling portion (vertical servomotor) 56 for controlling the vertical angle of the telescope 46, and a CPU (Central Processing Unit) 58 for controlling these respective portions and calculating results of measurement. As a matter of course, the telescope 46 can be manually turned easily.

Further, the surveying apparatus 110 according to the embodiment is further provided with an image processing unit 60 that removes noise from images obtained by the respective camera optical systems 47 and 89 to make the same into clear images, and discriminate a profile of an object to be measured and points of measurement, etc., a superimposing unit 62 for superimposing various types of information onto the images obtained from the respective camera optical systems 47 and 89; a touch-panel display 64 that displays the images obtained by the respective camera optical systems 47 and 89, points out the points of measurement by touching the same with point-of-measurement pointing out means such as a touch pen 68 or a finger, etc., and is able to input various types of data and commands (instructions); and an input/output unit 66 for inputting data into and outputting the same from a peripheral unit such as a mensuration control unit (personal computer) 65, etc., which is separate from the surveying apparatus 110.

The image processing unit 60 and superimposing unit 62 are attached to the inside of the surveying apparatus 110, and the touch panel display 64 is attached to the lower rear side of the horizontal rotation portion 42. The touch-panel display 64 not only displays images picked up by the respective camera optical systems 47 and 89 but also displays rectile lines (cross-shaped lines) 92 showing a direction 01 or 0 of a collimation axis (optical axis) of the wide-angle camera optical system or the collimation camera optical system, icons for inputting various types of commands (instructions), ten keys for inputting data, and results of measurement, which are obtained by the distance measuring portion 48 and angle measuring portions 50 and 52, so as to superimpose these by the superimposing unit 62.

As a matter of course, instead of the touch-panel display 64, the surveying apparatus 110 may be provided with a display such as a normal liquid crystal display, etc., and a keyboard for inputting various types of commands (instructions) and data, which are prepared as separate members, and a cursor movement key, a mouse, a track ball, a joystick, etc., may be used as point-of-measurement pointing out means. Also, the surveying apparatus 110 according to the embodiment includes a distance measuring portion 48, angle measuring portions 50 and 52 and has the same functions as those of the total station. However, if the surveying apparatus 110 has angle measuring portions 50 and 52 since the size of a target is known in advance, the distance to the target can be obtained on the basis of the size of the target image picked up by a wide-angle camera optical system 89. Therefore, the same functions as those in the total station are not necessarily required.

The wide-angle camera optical system 89 is composed of a wide-angle camera 87 and wide-angle CCD camera element 88. The optical axis 01 of the wide-angle camera optical system 89 is constituted to be parallel to the collimation axis 0 of the collimation camera optical system 47. In addition, the wide-angle CCD camera 89 is provided with a zooming unit including a focusing lens 19' and is further provided with a zooming type auto-focusing mechanism for adjusting a distance (far and near) of a target. As a matter of course, the zooming unit maybe omitted for downsizing and reducing production costs. Also, the wide-angle camera optical system 89 itself may be omitted, and other suitable pick-up devices may be employed instead of the wide-angle CCD camera element 88.

The collimation camera optical system 47 has an object lens 11, a reflection prism 70, a dichroic mirror 72, a beam splitter 120, and a collimation CCD camera element 45 on the collimation axis 0. Also, the collimation camera optical system 47 includes a distance measuring portion optical system, which is composed of alight emitting element 74 such as an infrared ray LED emitting photometric light, a condensing lens 76 for condensing the photometric light, and a dichroic mirror 78 for reflecting the condensed photometric light toward a reflection prism 70.

The optical axis 02 of the distance measuring portion optical system is conjugate with the collimation axis 0, that is, the optical axis 02 is in the coaxial optical system with the collimation axis 0. In addition, the collimation camera optical system 47 has an illumination unit which is composed of a light source 80 such as an LED for lighting with visible light, a condensing lens 82 for condensing the illumination light, and a mirror 84 for reflecting the condensed illumination light toward a reflection prism 70. The optical axis 03 of the illumination unit is conjugate with the collimation axis 0, and is in the coaxial optical system with the collimation axis 0.

Further, the collimation camera optical system 47 is provided with a light emitting element 86 such as a photo diode where photometric light reflected by the target is further reflected by a diochroic mirror 72 and is made incident into; a beam splitter 120 that divides illumination light reflected by the target into two; a collimation CCD camera element 45 where one of the illumination lights divided into two by the beam splitter 120 passes through the focusing lens 19 and forms an illuminated target image, and converts the image into a digital image; and a cross-shaped line sensor 122 that recognizes the incident position of the other illumination light. As a matter of course, instead f the collimation CCD camera element 45, other adequate pick-up devices may be employed, and instead of the cross-shaped line sensor 122, an adequate sensor such as a four-division sensor may be used.

An infrared ray laser beam may be used as the illumination light. However, since it is difficult to illuminate the entirety of the field of view of a wide-angle CCD camera element 88 with the laser beam, the present embodiment is provided with an illumination device that emits illumination light of visible light brought about by the light source 80 such as an LED, etc. so as to easily spread the illumination light over the entirety of the field of view. Therefore, where measurement is made in a dark place indoors, it is easy for an operator to recognize the illumination light reflected by the target, and the illumination device is convenient. Also, in the present embodiment, the light source 80 is caused to flash by a changeover instruction for turning on and off, which is from the CPU 58. As a matter of course, the light source 80 may be caused to flash by an adequate modulation circuit. If the light source 80 is caused to flash, a target that can be directly observed in a dark place, and a target image on the touch-panel display 64 can flash, wherein it is further easier to recognize the target and it becomes easy to point out the point of measurement.

Here, distance measurement light (LED light or infrared ray laser beam) emitted from the light emitting element 74 is transmitted to a target of an object to be measured, via the light condensing lens 76, dichroic mirror 78, reflection prism 70, and objective lens 11. And, the distance measurement light reflected by the target inversely returns to the optical pass where the light has just come through, penetrates the objective lens 11, is reflected by the dichroic mirror 72 in the orthogonal direction, and is made incident into the light receiving element 86. The distance to the target is calculated, as in the prior arts, by a phase error between reference light that is made incident from the light emitting element 74 directly into the light receiving element 86 by an optical fiber (not illustrated) and the distance measurement light that is reflected from the target and is made incident into the light receiving element 86.

On the other hand, the illumination light emitted from the light source 80 is transmitted to the target placed at the point of measurement of an object to be measured, via the light condensing lens 82, mirror 84, reflection prism 70 and objective lens 11. And, the illumination light reflected by the target inversely returns to the optical pass where the illumination has just come through, penetrates the objective lens 11 and dichroic mirror 72, and is divided into two by the beam splitter 120, wherein one of the divided lights forms an illuminated target image via the focusing lens 19, is made incident into the collimation CCD camera element 45 where the image is converted into a digital, image, and the other is condensed at the cross-shaped line sensor 122.

However, the present embodiment is provided with the first automatic collimation device consisting of a collimation CCD camera element 45, a CPU 58, an image processing unit 60, a horizontal controlling portion 54, and a vertical controlling portion 56, the second automatic collimation device consisting of a cross-shaped line sensor 122, a CPU 58, a horizontal controlling portion 54, and a vertical controlling portion 56, and a spare collimation device consisting of a wide-angle CCD camera element 88, a CPU 58, an image processing image unit 60, a horizontal controlling portion 54, a vertical controlling portion 56, and a zooming unit (not illustrated).

Figure 6:
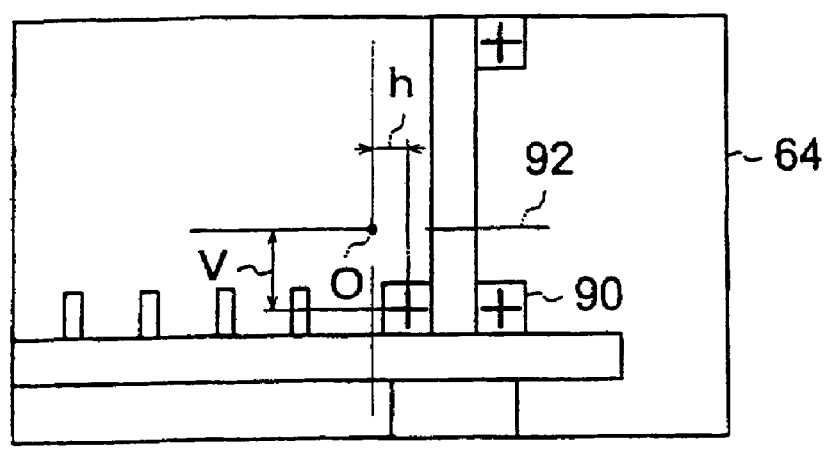
FIG. 6 is a view showing an image which is obtained by a wide-angle camera optical system of the above-described surveying apparatus.

First, a detailed description is given of the first automatic collimation device having the collimation CCD camera element 45 on the basis of FIG. 2 and FIG. 6. The center of the light receiving portion of the collimation CCD camera element 45 is made coincident with the collimation axis 0 of the collimation camera optical system 47, wherein since a light beam along the collimation axis 0 is made incident into the center of the light receiving portion of the collimation CCD camera element 45, a deviation h in the horizontal direction and a deviation v in the vertical direction between the collimation axis 0 and the target image 90 correspond to an angle formed by the collimation axis 0 and the target direction on the touch-panel display 64 as shown in FIG. 6. Therefore, by making both deviations v and h into zero, the target can be automatically collimated.

Accordingly, image signals from the collimation CCD camera element 45 are inputted into the CPU 58 via a signal processing portion (not illustrated) (amplifier, waveform rectifier, A/D converter, etc.) The CPU 58 discriminates the profile of an object to be measured, and a target image 90 from the image obtained from the collimation CCD camera element 45 and displays the same on the touch panel display 64 in the image processing unit 60. Also, the rectile lines 92 are displayed on the center of the touch panel display 64, and the intersection of the rectile lines 92 are made coincident with the collimation axis 0. Herein, as a target image 90 that is desired to be pointed out on the touch-panel display 64 is touched by a touch pen 68, the CPU 58 captures the deviation h in the horizontal direction and deviation v in the vertical direction between the point touched by the touch pen 68 and the collimation axis 0, and transmits control signals responsive to both deviations h and v to the horizontal controlling portion 54 and the vertical controlling portion 56, respectively. Thereby, both controlling portions 54 and 56 cause the telescope 46 to turn by control signals in response to both deviations h and v, and moves the point touched by the touch pen 68, that is, the pointed up target image 90 onto the collimation axis 0. Thus, as the target image 90 moves into the vicinity of the collimation axis 0, the CPU 58 recognizes the pointed up target image 90. Thereafter, the CPU 58 captures the deviation h in the horizontal direction and deviation v in the vertical direction between the target image 90 and the collimation axis o and transmits control signals responsive to both of these deviations h and v to the horizontal controlling portion 54 and the vertical controlling portion 56, respectively, whereby automatic collimation is carried out.

Figure 4:
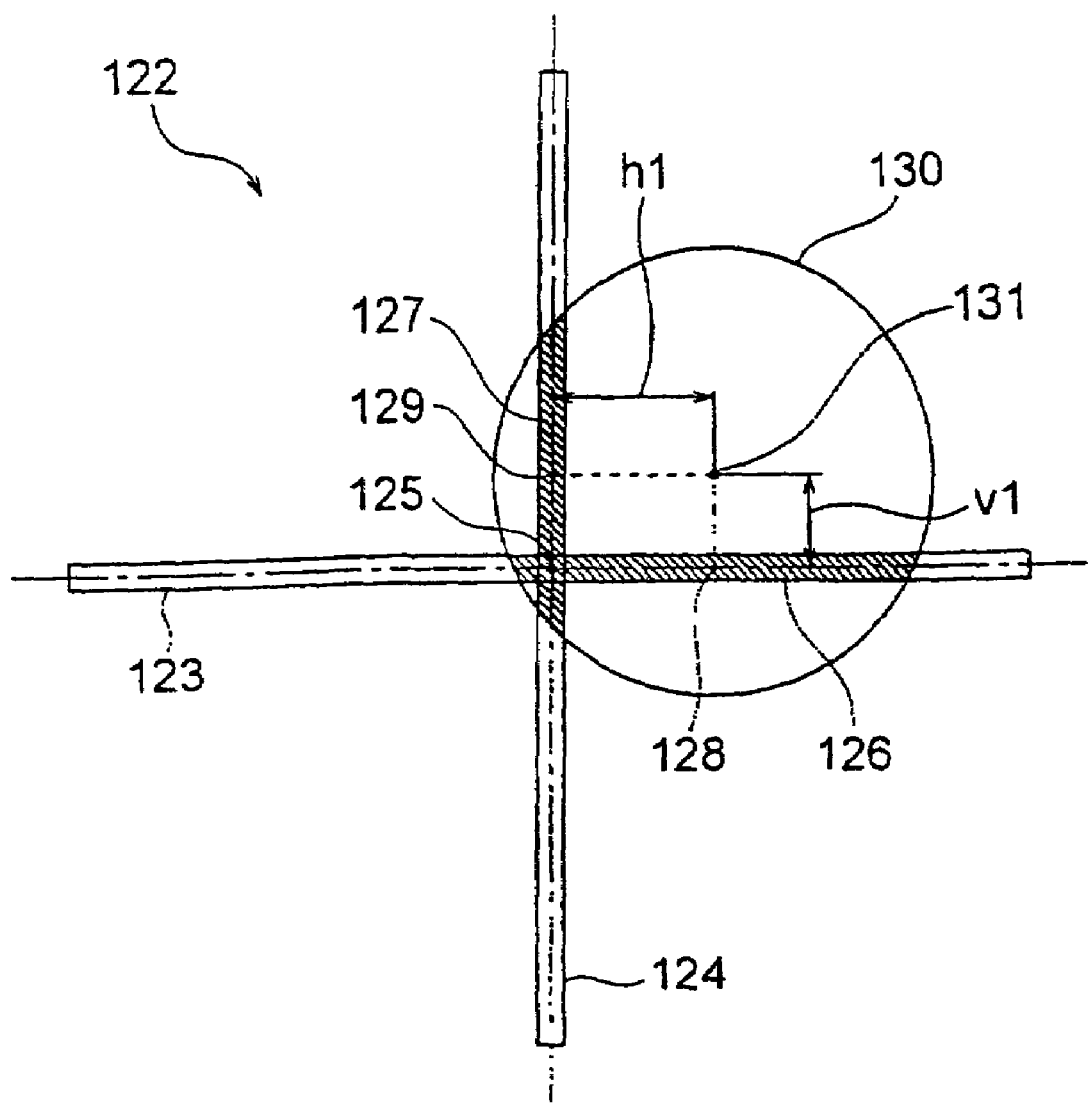
FIG. 4 is a view describing a cross-shaped line sensor.

Next, a description is given of the second automatic collimation device having a cross-shaped line sensor 122 on the basis of FIG. 2 and FIG. 4. The cross-shaped line sensor 122 is, as shown in FIG. 4, such a type in which two line sensors 123 and 124 are combined in the form of a cross. And, the center 125 thereof is made coincident with the position into which a light beam along the collimation axis 0 of the collimation camera optical system is made incident. Output signals from both line sensors 123 and 124 are inputted into the CPU 58 via a signal processing portion (not illustrated) (amplifier, waveform rectifier, and A/D converter, etc.) The CPU 58 captures the deviation h1 in the horizontal direction and deviation v1 in the vertical direction of the center 131 of an irradiation spot 130 of the reflection light of the light source 80 corresponding to the center 125 of the cross-shaped line sensor 122 by acquiring respective center points 128 and 129 of the respective light receiving portions 126 and 127 of both line sensors 123 and 124. Since both deviations h1 and v1 correspond to an angle formed by the collimation axis 0 and the target direction, the CPU transmits control signals responsive to both deviations h1 and v1 to 1e horizontal controlling portion 54 and the vertical controlling portion 56, respectively, wherein since the CPU causes the telescope to turn so that both deviations h1 and v1 are made into 0, thereby carrying out automatic collimation of the target. In the second automatic collimation device, an adequate sensor such as a four-division optical sensor that has been conventionally used may be used instead of the cross-shaped line sensor 122.

Next, a description is given of the spare collimation device having a wide-angle CCD camera element 88 on the basis of FIG. 2. The center of the light receiving portion of the wide-angle CCD camera element 88 is made coincident with the collimation axis 01 of the wide-angle camera optical system 89, wherein since the light beam along the collimation axis 01 is made incident into the center of the light receiving portion of the wide-angle CCD camera element 88, an image that is obtained by the wide-angle CCD camera element 88 is processed as well as the image obtained by the above-described collimation CCD camera element 43, thereby enabling automatic collimation. However, since the collimation axis 01 of the wide-angle camera optical system 89 slips only a distance d in parallel to the collimation axis 0 of the collimation camera optical system 89 and its magnification ratio is low, the spare collimation device is used for preliminary collimation for causing the telescope 46 to turn roughly to the vicinity of the target. Finally, highly accurate automatic collimation is enabled by using the first automatic collimation device including the collimation CCD camera element 45 or the second automatic collimation device including the cross-shaped line sensor 122.

The above-described second automatic collimation device is used mainly when measurement is carried out outdoors while the above-described first automatic collimation device is used mainly when measurement is carried out in a dark place indoors. The reason resides in that, although a measurement error is apt to occur upon receiving intensive disturbance of natural light when being used for outdoor measurement in the daytime, the second automatic collimation device is durable against disturbance.

Figure 5:
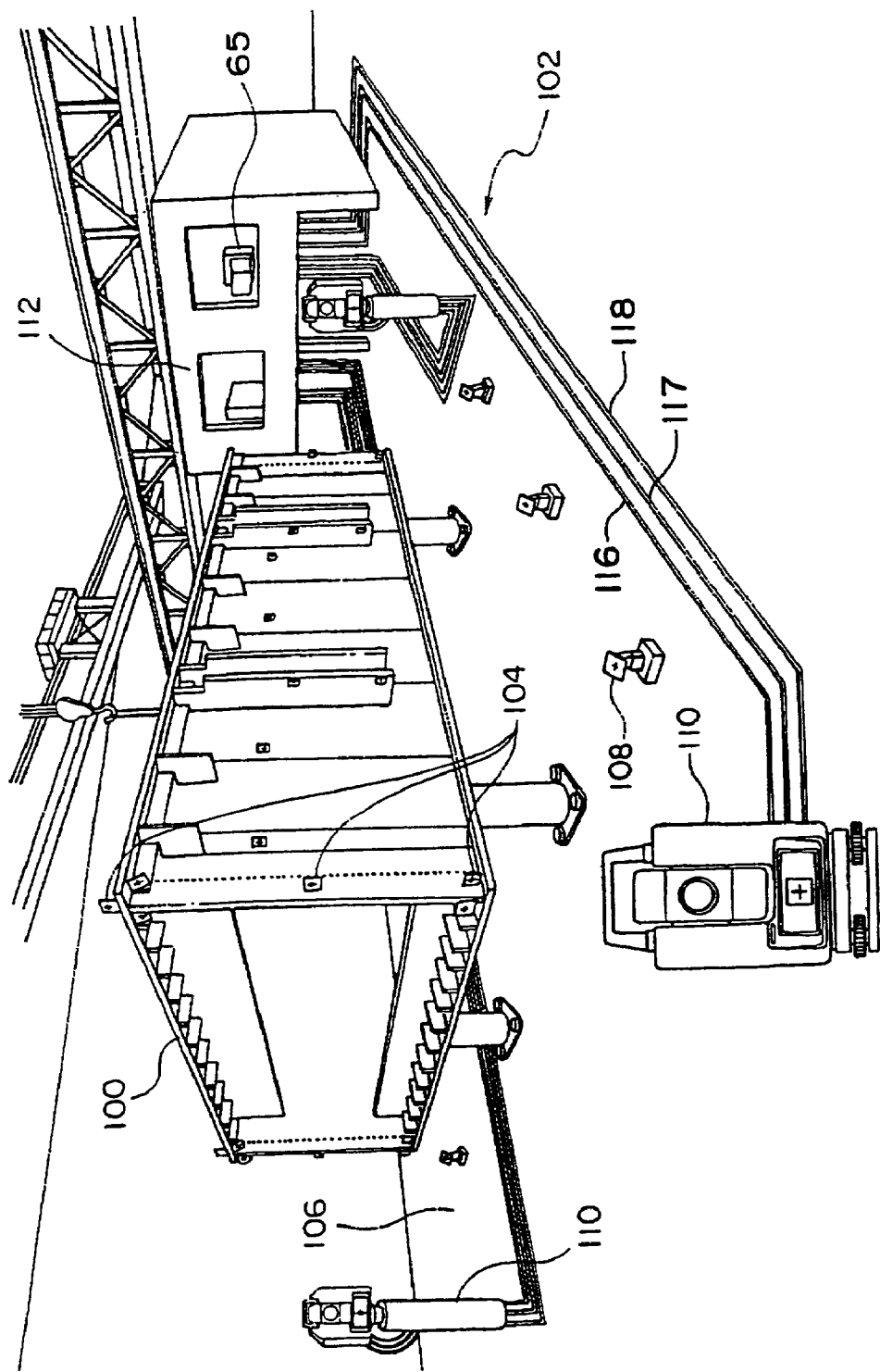
FIG. 5 is a view showing a method for measuring positions of respective portions of an object to he measured.

The following methods are employed in order to measure the positions of the respective points of measurements of a large-scaled structure. As shown in FIG. 5, an object 100 to be measured, which is a large-scaled structure, is installed in a dark place in a measuring chamber 102 in order to avoid disturbance of natural light, and respective targets (those in which cross-shaped lines are attached to a reflection prism sheet) 104 are attached to a number of points of measurement. A target 108 indicating, a reference point and a surveying apparatus 110 for measuring the positions of the respective targets 104 and 108 are installed on the floor 106, etc., of the measurement chamber 102.

First, a description is given of a measurement method in which only a single surveying apparatus 110 is installed. First, the surveying apparatus 110 is installed at an appointed position, and the main switch of the surveying machine 110 is turned on. As shown in FIG. 6, an image of the object 100 to be measured, which is obtained by the wide-angle camera optical system 89, and a rectile line 92 are displayed on the touch-panel display 64. At this time, since the targets 104 and 108 reflects light only in the direction along which the light has come if the light source 80 is turned on and is caused to flash, the target image 90 is particularly brightly displayed on the touch-panel display 64 and is caused to f lash, wherein an operator can easily recognize the target image 90, and subsequent measurement work can be facilitated. In addition, the image processing unit 60 can also easily recognize the target image 90, and the image processing can be facilitated.

Figure 7:
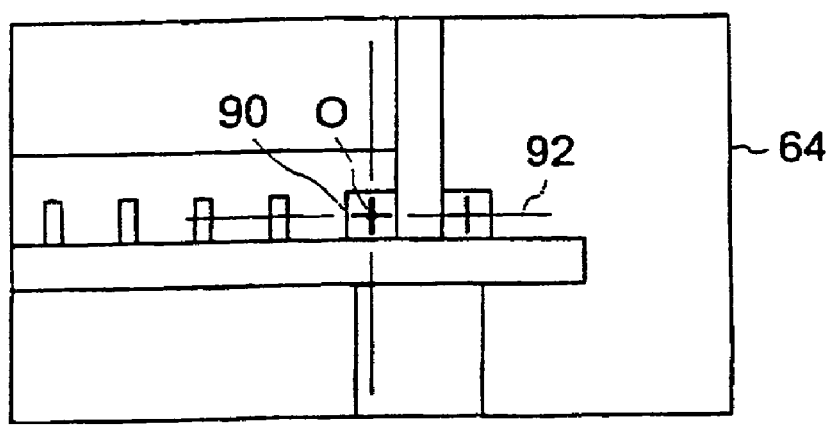
FIG. 7 is a view showing an image which is obtained by the above-described wide-angle camera optical system after preliminary collimation is carried out by using the image obtained by the above-described wide-angle camera optical system in the above-described surveying apparatus.

Next, the target image (point of measurement or reference point) which is displayed on the touch-panel display 64 is touched by a touch pen to point out the targets 104 and 108 to be measured, whereby the spare collimation device moves and causes the telescope 46 to turn until the center of the rectile line 92 indicating the collimation axis 0 is in agreement with the pointed out target image 90 on the touch-panel display 64 as shown in FIG. 7, and the pointed out target image 90 is moved to the middle of the screen.

Figure 8:
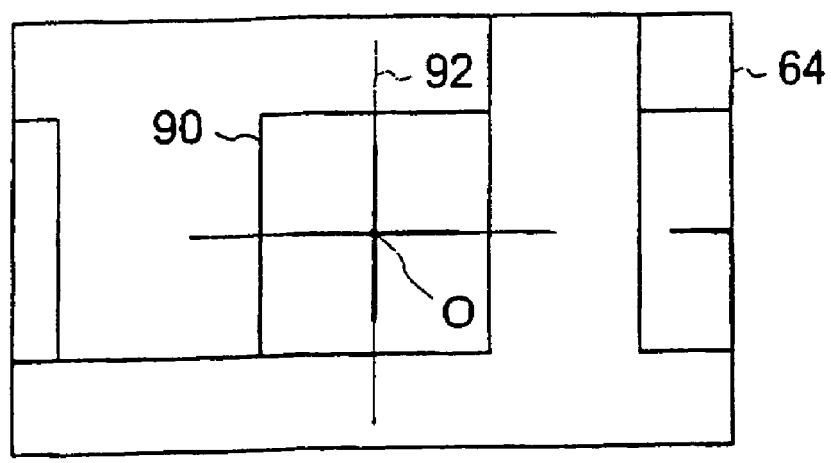
FIG. 8 is a view showing an image which is obtained by the above-described wide-angle camera optical system after automatic collimation is carried out by using the image obtained by the above-described collimation camera optical system in the above-described surveying apparatus.

Thus, as the pointed out target 104 or 208 is roughly collimated, the wide-angle camera optical System 89 is automatically changed to the collimation camera optical system 47 by programs in order to secure further accurate collimation. As shown in FIG. 8, the target image 90 and rectile line 92 are displayed on the touch-panel display 64. Herein, as the target 104 or 108 is accurately collimated by the first or the second automatic collimation device, distance measurement is automatically carried out, and at the same time, the horizontal angle and vertical angle are also measured. At this time, these measured values are converted into coordinate values on the designated coordinate system and are recorded on an adequate recording medium (not illustrated).

Figure 9:
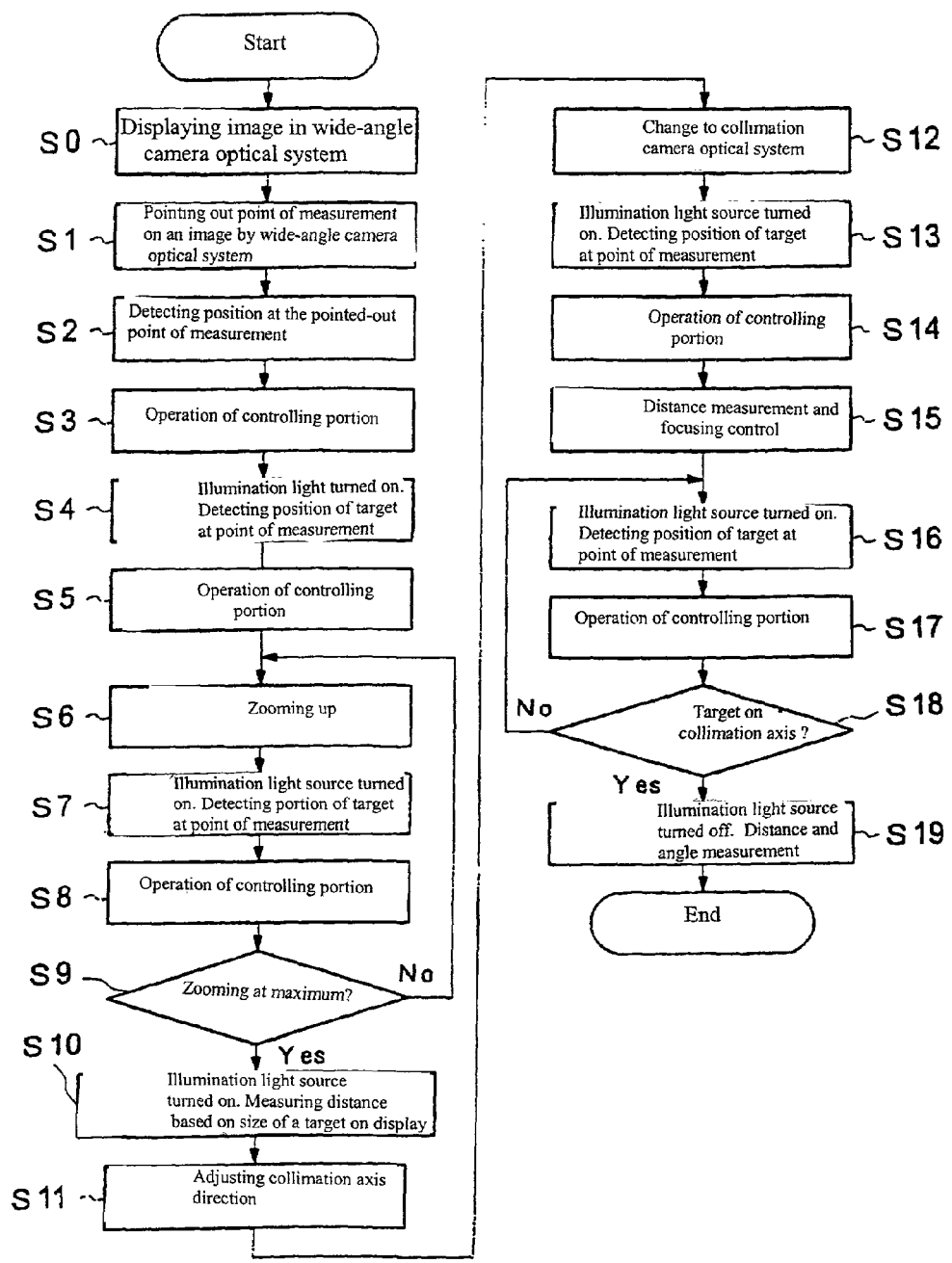
FIG. 9 is a flowchart describing a procedure for measuring positions of the points of measurement by the above-described surveying apparatus.

A further detailed description is given of a procedure of the above-described measurement method on the basis of the image displayed on the touch-panel display 64 shown in a flowchart of FIG. 9 and in FIG. 10 through FIG. 17. However, in the following drawings, only the image 90 of the target 104 and rectile line 92 indicating the collimation direction are shown on the touch-panel display 64 in order to simplify the description thereof.

Figure 10:
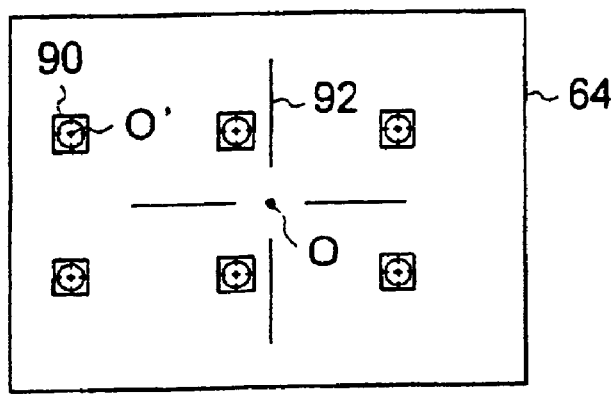
FIG. 10 is a view showing the extremely wide-angle image which is obtained by the wide-angle camera optical system before commencing automatic collimation of the above-described surveying apparatus.

First, the surveying apparatus 110 is installed at an appointed place, and the main switch (not illustrated) of the surveying apparatus 110 is turned on. Here, the process advances to Step S0. As shown in FIG. 10, the wide-angle camera optical system 89 is set extremely to the wide-angle, and an object 100 to be measured (not illustrated), target image 90 and rectile line 92 on the image are displayed on the touch-panel display 64. At this time, the position of the focusing lens 19' is adjusted by an auto-focusing control device (not illustrated), and focusing is made on the targets 104 and 108. Also, the center of the rectile line 92 always indicates the collimation axis 0 of the wide-angle camera optical system 89 or the collimation camera optical system 47 even though the telescope, 46 is turned vertically or horizontally. Accordingly, the center of the rectile line is given the reference number 0 in the following drawings.

Next, the process shifts to Step S1. By touching the target image 90, which is located, at the point of measurement displayed on the touch-panel display 64, by a touch pen 68, the targets 104 and 108 to be measure i d are pointed out. If the targets 104 and 108 to be measured a ! re not displayed on the touch-panel display 64, the telescope 46 of the surveying apparatus 110 is manually turned in the direction where the point of measurement exists, and the point of measurement is displayed on the touch-panel display 64, thereby pointing out the targets 104 and 108 to be measured. Also, if an adequate point on the touch-panel display 64 is touched by the touch pen 68, the point can be moved to the center of the touch-panel display 64 as described below, wherein it is possible to display the point of measurement, which has not been displayed until now, on the touch-panel display 60

Figure 11:
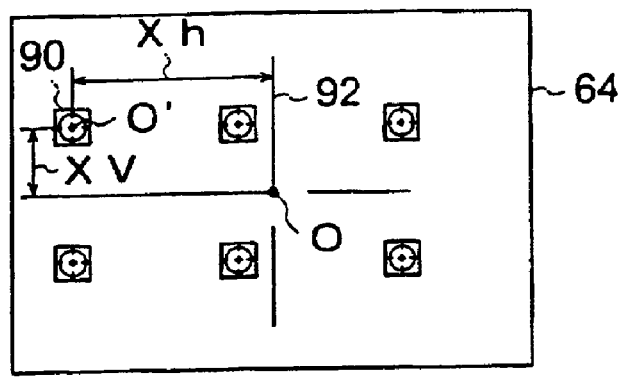
FIG. 11 is a view showing a horizontal deviation and a vertical deviation between the center of a target at a point of measurement and the center of the rectile line in FIG. 10.
Figure 12:
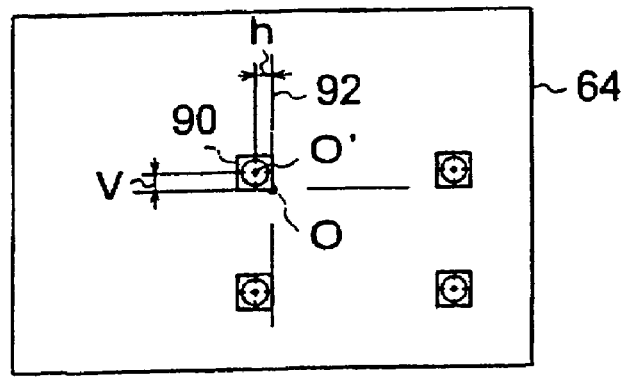
FIG. 12 is a view showing a process of causing a target to move in the direction of a collimation axis in the extremely wide-angle state of the above-described wide-angle camera optical system.

As the targets 104 and 108 to be measured are pointed out, the process shifts to Step S2, wherein the spare collimation device begins to operate, and the CPU 58 detects the horizontal deviation h and the vertical deviation v between the point touched by the touch pen 68 and the center 0 of the rectile line as shown in FIG. 11 (wherein the deviations are expressed in terms of number of pixels). Next, the process shifts to Step S3, wherein both deviations h and v are transmitted to the horizontal controlling portion 54 and the vertical controlling portion 56 to actuate both the controlling portions 54 and 56, and the telescope 46 is caused to turn so that both the deviations h and v are made into 0. As shown in FIG. 12, the point touched by the touch pen 68 is moved to the center 0 of the rectile line 92 at the middle of the screen of the touch-panel display 64. Since the pointed o t target image 90 moves roughly to the center 0 of the rectile line 92, the CPU 58 can securely recognize the target image 90.

Figure 13:
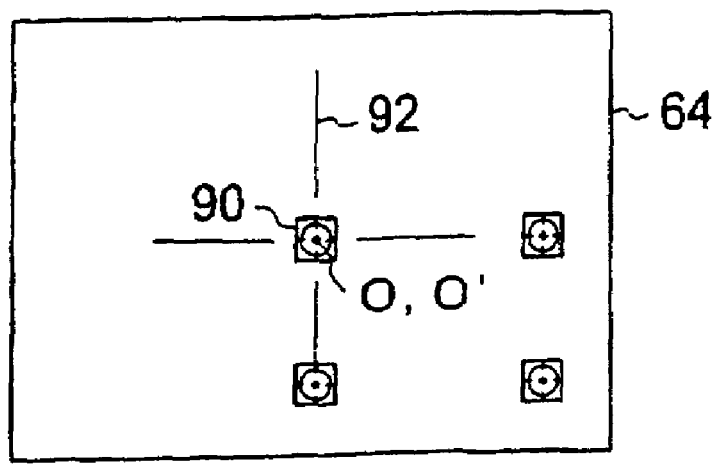
FIG. 13 is a view showing a state where the center of the target is in agreement with the collimation axis in the extremely wide-angle state of the above-described wide-angle camera optical system.

However, since it is difficult to accurately touch the center 0' of the target image 90 by the touch pen 68, there may be cases where the center 0' of the target image 90 is not made coincident with the center 0 of the rectile line 92 as shown in FIG. 12. Therefore, the process shifts to Step S4. The spare collimation device turns on the light source 80 and emits illumination light in order to accurately make the center 0' of the target image 90 coincident with the center 0 of the rectile line, and receives light of the image of the target 104. Further, the spare collimation device detects the position of the target image 90, that is, the horizontal deviation h and vertical deviation v between the center 0' of the target image 90 and the center 0 of the rectile line 92. When both the deviations h and v are captured, the light source 80 is turned off. And, the process shifts to Step S5 where both deviations h and v are transmitted to the horizontal controlling portion 54 and vertical controlling portion 56 to actuate both the controlling portions 54 and 56, thereby causing the telescope 46 to turn so that both the deviations h and v are made into 0. As shown in FIG. 13, the center of the pointed out target image 90 is moved onto the center 0 of the rectile line 92, and provisional preliminary collimation is carried out.

Figure 14:
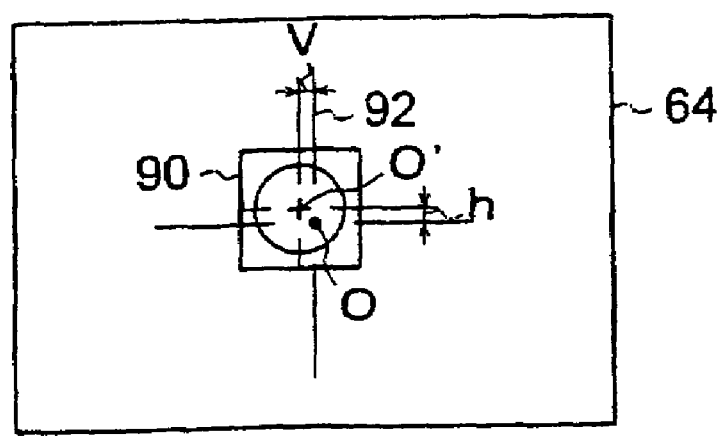
FIG. 14 is a view showing a state where the above-described wide-angle camera optical system is slightly zoomed up halfway of preliminary collimation of the above-described surveying apparatus.

As the provisional preliminary collimation is terminated, the process shifts to Step S6 for further accurate collimation, wherein the wide-angle camera optical system 89 is slightly zoomed up. The reason why the optical system 89 is slightly zoomed up is that the target 104 moves out of the field of view due to a collimation error, etc., if zooming is once carried out to the maximum magnification ratio, and there is a possibility that automatic collimation will be disabled. As the wide-angle camera optical system 89 is zoomed up, it is normal that the center 0' of the target image 90 slightly slips from the center 0 of the rectile line 92 as shown in FIG. 14.

Figure 15:
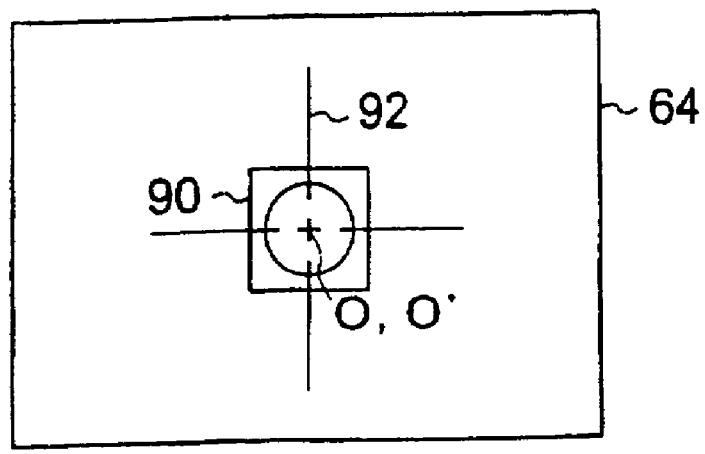
FIG. 15 is a view where the center of a target is in agreement with the collimation axis in a state where the above-described wide-angle camera optical system is slightly zoomed up.

Accordingly, the process shifts to Step S7. The light source 80 is turned on as in Step S4, and the position of the target image 90 is detected again. After that, the light source 80 is turned off. And, the process shifts to Step S8. Both the controlling portions 54 and 56 are actuated as in Step S5, and provisional preliminary collimation is carried out, by which the center O' of the target image 90 is moved onto the center O of the rectile line 92 as shown in FIG. 15.

Then, the process shifts to Step S9. It is checked whether or not the wide-angle CCD camera element 88 is set to the maximum magnification ratio. Where the wide-angle CCD camera element 88 does not reach the maximum magnification ratio, the process returns to Step S6. However, if the maximum magnification ratio is reached, the process shifts to Step S10. The light source 80 is turned on, and the distance to the target 104 is measured. Thereafter, the light source 80 is turned off. As regards the distance measurement, the distance is calculated on the basis of a size of the target image 90 on the touch-panel display 64, and utilizes the already known size of the target image 104.

Figure 16:
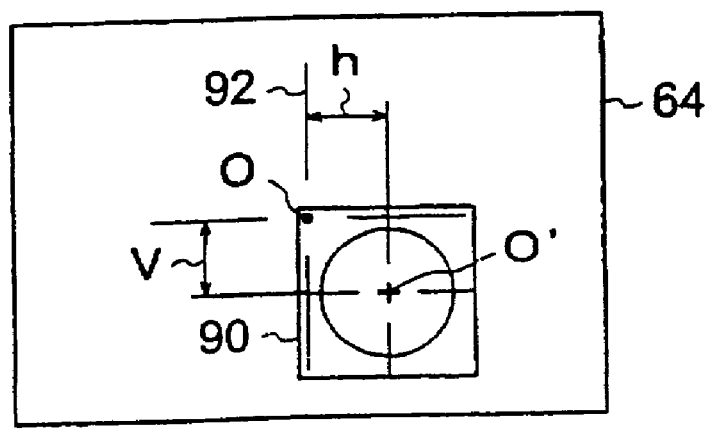
FIG. 16 is a view showing an image captured by the above-described collimation camera optical system immediately after being changed to the collimation camera optical system.

As the distance to the target 104 is captured, the process shifts to Step S11. An adjusting angle of the orientation of the telescope 46 is calculated from this distance and the distance d between the collimation axes of both camera optical systems 47 and 89, so that the target 104 is positioned on the collimation axis O of the collimation camera optical system 47, thereby calculating the adjusting angle of the orientation of the telescope 46 and adjusting the orientation of the telescope 46. And, for further accurate collimation, the process advances to step S12. As shown in FIG. 16, the wide-angle camera optical system 89 is automatically changed, by programs, to the collimation camera optical system 47 having a high magnification ratio when the target image 90 enters the central area of the rectile line 92, and the position of the focusing lens 19 is adjusted to focus on the target 104. At this time, focusing control of the collimation camera optical system 47 utilizes the distance obtained by the distance measurement in Step S10.

Figure 17:
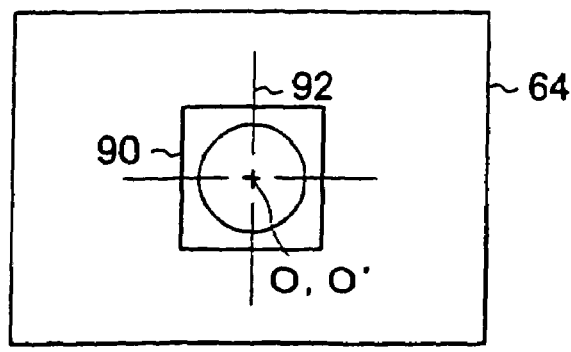
FIG. 17 is a view showing an image captured by the collimation camera optical system in a state where the center of the target is in agreement with the collimation axis.
Figure 18:
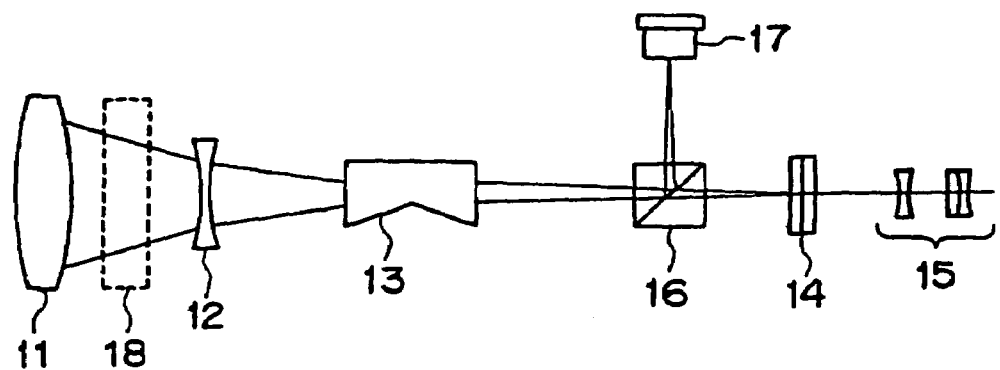
FIG. 18 is a view showing the optical system of a surveying apparatus provided with a prior art pick-up device.
Figure 19:
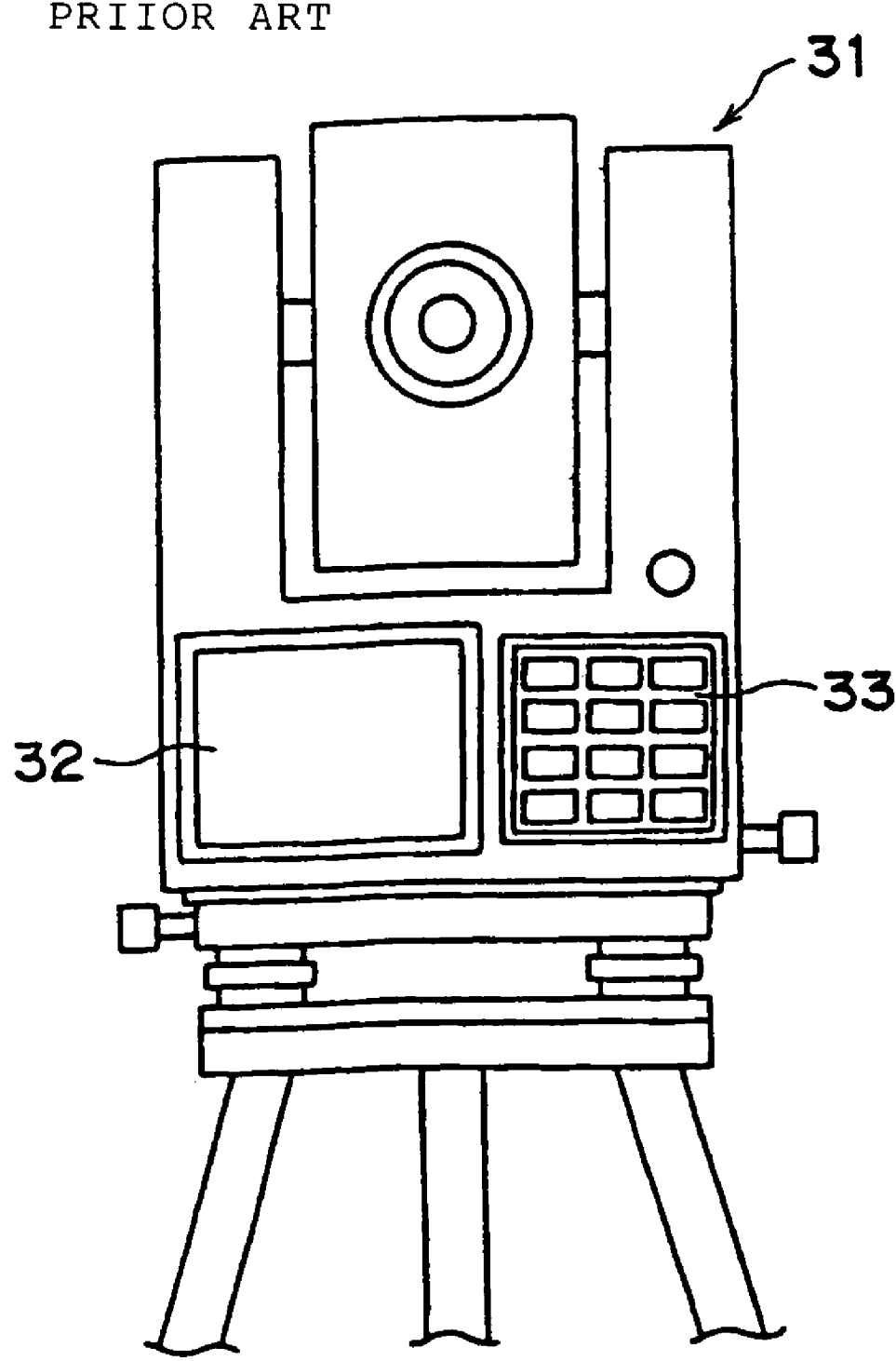
FIG. 19 is a rear view of the above-described prior art surveying apparatus.
Figure 20:
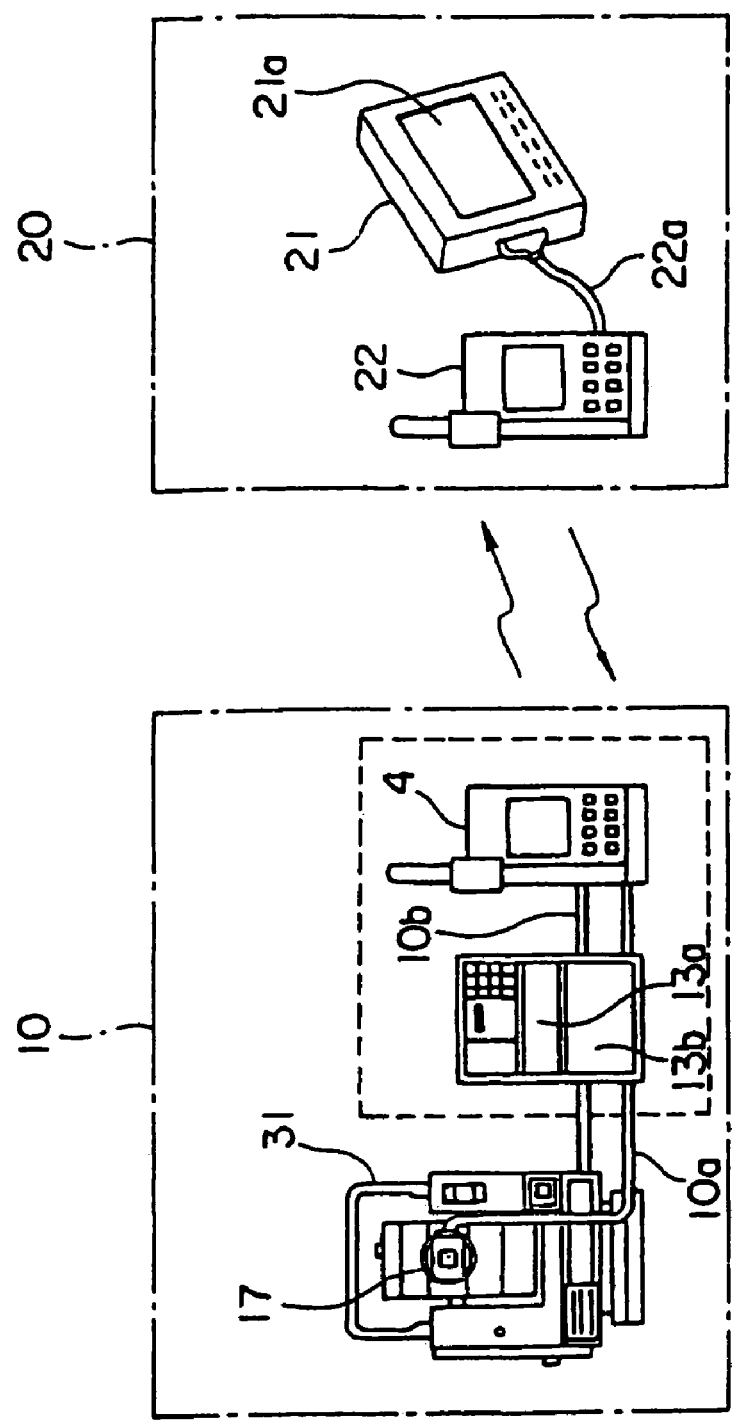
FIG. 20 is a view showing another surveying apparatus provided with a prior art pick-up device.

Next, the process shifts to Step S13. The light source 80 is turned on as in Step S4, and the position of the target image 90 is detected. And, the process shifts to Step S14 where both the controlling portions 54 and 56 are actuated again as in Step S5, and the first automatic collimation device provisionally carries out automatic collimation. Next, the process shifts to Step S15. The light source 80 is turned off, an accurate distance to the target 104 is obtained by the distance measuring portion (optical wave range finder) 48. Using the distance, focusing is accurately made on the target 104. Accordingly, the process shifts to Step S16. The light source 80 is turned on as in Step S4, and the position of the target image 90 is detected. And, the process shifts to Step S17 where both the controlling portions 54 and 56 are actuated as in Step S5. Then, the final automatic collimation is carried out by the first automatic collimation device. As shown in FIG. 17, the center O' of the target image 90 is accurately positioned on the center O of the rectile line.

Thereafter, the process shifts to Step S18. It is checked whether or not the center O' of the target image 90 is accurately positioned on the center O of the rectile line 92, that is, whether or not the horizontal deviation h and vertical deviation v between the center O' of the target image 90 and the center O of the rectile line 92 are within an appointed range (for example, to be less than the control accuracy of the servomotor of both the controlling portions 54 and 56). When both the deviations h and v are within an appointed range, the process shifts to Step S19. The light source 80 is turned off, and the distance to the target 104 is captured by the distance measuring portion (optical wave range finder). Simultaneously, the horizontal angle and vertical angle of the telescope 46 are obtained by the horizontal angle measuring portion 50 and vertical angle measuring portion 52. These angles are obtained by an optical encoder. If the coordinate system is designated, it is converted to a coordinate in a coordinate system pointed out by these distances and angles. Where both deviations h and v are outside the appointed range, the process shifts to Step S16.

In the above-described measurement, the light source 80 is turned on only when detecting the position of the point of measurement in Steps S4, S7, S13 and S16 and calculating the distance in Step S10. That is, since the light source 80 is turned off without fail in Steps S15 and S19 where a distance is measured by the distance measuring portion 48, the illumination light by the light source 80 does not bring about any error in the distance measurement. Thus, since the light source 80 is turned on only for a short time when necessary, it is possible to obtain a surveying apparatus that can save electricity.

Thus, as measurement of one point of measurement or one reference point is completed, the collimation camera optical system is changed to the wide-angle camera optical system 89 again, and such an image as shown in FIG. 6 is displayed. Therefore, a target image 90 to be measured next is pointed out by the touch pen 68. Positions of the targets 104 and 108 are measured one after another as in the above description.

On the other hand, if an automatic measurement switch (not illustrated) is turned on, the CPU 58 automatically points out the targets 104, which are attached to an object 100 to be measured, and targets 108, which indicate a reference point, in order from end to end, and can automatically carry out all the above-described measurements. In this case, if coordinate values of points of measurement and reference points are inputted in advance by using a peripheral device such as a measurement controller 65, etc., automatic measurement can be efficiently carried out.

Thus, as the above-described measurement is completed at one point, the surveying apparatus 110 is moved to the next point. As described above, the targets 104 and 108 are measured from end to end, and such a measurement is carried out at all planned points of measurement. Thus, after the measurement is completed at the planned points, the results of the measurement are displayed on the touch-panel display 64, and, at the same time, are recorded on an adequate recording medium (not illustrated). Then, the measurement is terminated.

The above description explains a measurement method with only a single surveying apparatus used. However, usually, a plurality of surveying apparatuses 110 are installed on the floor 106 of the measurement chamber 102, and these surveying apparatuses 110 and measurement controller 65 (personal computer) provided in an observation chamber 112, which is provided with a display (image display device) are connected to each other by a power cable 116, a picture cable 117 and a communications cable 118, wherein the respective surveying apparatuses 110 are remotely controlled by the measurement controller 65, and pictures obtained by the respective surveying apparatuses 110 and results of measurement are immediately transmitted to the measurement controller 65. That is, the measurement can be efficiently carried out. As a matter of course, the measurement controller 65 is installed in an office which is farther form the objects to be measured, wherein the respective surveying apparatuses 110 may be connected to the measurement controller 65 via an adequate communications device (telephone, mobile telephone, wireless device, etc.)

Where such a surveying apparatus 110 is remotely operated, when a measurement commencement instruction is sent from the measurement controller 65 to one surveying apparatus 110, the main switch of the surveying apparatus 110 is turned on, the surveying apparatus 110 transmits a picture of an object 100 to be measured, which is obtained from the wide-angle CCD camera element 88, to the measurement controller 65. Therefore, an image of the object 100 to be measured is displayed on the display of the measurement controller 65. Since the measurement controller 65 incorporates the same measurement control programs as those of the surveying apparatus 110, the targets 104 and 108 are subsequently measured from end to end as in the case of the method employed for the above-described surveying apparatus 110. As all the measurements are completed by the surveying apparatus 110, the main switch of the surveying apparatus 110 is turned off. After that, a measurement commencement instruction is issued to the next surveying apparatus 110. Measurements are carried out by all the surveying apparatuses 110 as in the above description. As the measurements are completed by all the surveying apparatuses 110, the measurement controller 65 displays the results of the measurements on its display, and simultaneously, the results of the measurements are recorded on an adequate recording medium. The results of the measurements are printed out as necessary. Then, the measurements are terminated.

Since erroneous collimation is likely to occur due to intensive disturbance of natural light if automatic collimation is carried out from an image captured by the collimation CCD camera element 45 where measurement is carried out outdoors, the CPU 58 judges the background brightness by the collimation CCD camera element 45 when the background brightness obtained by the collimation CCD camera element 45 or the wide-angle CCD camera element 88 exceeds an appointed value, and the automatic collimation is automatically changed to the second automatic collimation employing a cross-shaped line sensor by programs. In this case, automatic collimation can be carried out by only pointing out a target image 90 on an image having a wide field of view, which is obtained by the wide-angle CCD camera element 88, on the display of the measurement controller 65 and the touch-panel display 64 of the surveying apparatus 110.

As has been made clear in the above description, in the present embodiment, it is possible to efficiently measure a number of points-of-measurement positions with a single operator at the measurement controller 65 side or the surveying apparatus 110 side with respect to an object 100 to be measured such as a large-scaled structure. At this time, an operator is able to point out a target image 90 on an image having a wide field of view, which is obtained by the wide-angle CCD camera element 88, on the display of the measurement controller 65 or the touch-panel display 64 of the surveying apparatus 110. After that, automatic collimation is enabled by the automatic collimation unit 69. Subsequently, since the positions of the points of measurement can be automatically measured, such advantages can be brought about in that a load burden on an operator can be reduced, and no artificial collimation error is brought about. Further, the measurement can be executed by a single operator and a single surveying apparatus 110 if the surveying apparatus 110 is moved. In addition, as regards remote control of the surveying apparatus 110 by the measurement controller 65 which is installed at a place far from the surveying apparatus 110, an operator is able to securely carry out measurement work while checking the state of measurement on the display of the measurement controller 65.

Also, since illumination light of visible light, which is easy to diffuse, is emitted coaxially from the light source 80 with the collimation axis 0, sufficient illumination light can be returned from the points of measurement. Therefore, an object 100 to be measured can be brightly displayed on the touch-panel display 64 at a wide angle. Further, the illumination light has sufficient collimation accuracy, wherein there is no case where any error is provided in the distance measurement. In particular, the illumination light is emitted only as necessary. That is, no illumination light is emitted when measuring a distance by the distance measuring portion (optical wave range finder) 48. No error is provided in the distance measurement. Still further, electricity can be saved.

As has been made clear in the above description, with the invention according to the first aspect, since it is possible to discriminate, by an image processing unit, points of measurement from an image picked up by a pick-up device, the points of measurement can be automatically collimated by an automatic collimation unit if one point of measurement is pointed out on an image on a display. A load burden on an operator can be lightened, and no artificial collimation error is brought about. And, it is possible to efficiently measure a number of point-of-measurement positions without any remarkable load with respect to an object to be measured such as a large-scaled structure. In addition, by moving a surveying apparatus, such a measurement can be easily carried out only by a single operator and a single surveying apparatus.

With the invention according to the second aspect, since it is possible to point out the points of measurement only by touching the points of measurement of the image, which is displayed on the touch-panel display, by using point-of-measurement pointing out means, no cumbersome work for collimating the points of measurement is brought about, and any artificial collimation error is permitted, wherein a load burden on an operator is lightened, and the measurement accuracy can be improved. Further, a conventional keyboard is no longer required. Since the touch-panel display can be made large, the points of measurement can be further easily pointed out.

With the invention according to the third aspect, since it is possible to observe a wide portion of an object to be measured, by the wide-angle camera optical system, it becomes easier to point out the points of measurement. Finally, since measurement can be carried out through automatic collimation by using an image obtained by a collimation camera optical system of a high magnification ratio, highly accurate collimation and measurement can be carried out.

With the invention according to the seventh aspect, since illumination light of visible light, which is concurrently used as a collimation beam, is emitted coaxially with the collimation axis, sufficient reflection light can be returned from a target, and an object to be measured can be displayed on a display with a clear profile at a wide range, wherein it is easier to point out points of measurement, and further highly accurate collimation and measurement can be carried out.

With the invention according to the eighth aspect, since the illumination light which is concurrently used as collimation light, is emitted only as necessary, and is not emitted when measuring a distance by the distance measuring portion, it is possible to prevent an error in distance measurement from occurring by the illumination light, and electricity can be saved.

With the invention according to the ninth aspect, since the pick-up device, illumination unit, and distance measuring portion optical system are constructed as a coaxial optical system, the illumination light can be securely emitted coaxially with the collimation axis, wherein it is possible to easily point out the points of measurement, and furthermore highly accurate collimation and measurement are enabled.

With the invention according to the tenth aspect, since the illumination unit is further provided with a flashing light source, if the light source is caused to flash, both a target that is directly observed in a dark place and a target image on the display can flash to ensure easy observation, wherein it is easier to recognize targets and the pointed-out points of measurement can be further facilitated.

INDEX OF COMPONENTS

45 Collimation CCD camera element (Pick-up device)
46 Telescope
47 Collimation camera optical system
48 Distance measuring portion
60 Image processing unit
64 Touch-panel display (Display)
65 Measurement controller
68 Touch pen (Point-of-measurement pointing out means)
69 Automatic collimation unit
80 Light source (Illumination unit)
88 Wide-angle CCD camera element (Pick-up device)
89 Wide-angle camera optical system
90 Target image (Point of measurement)
104 Target (Point of measurement)
122 Cross-shaped line sensor
0 Collimation axis

[FIG. 1]
47 Collimation camera optical system
48 Distance measuring portion
50 Horizontal angle measuring portion
52 Vertical angle measuring portion
54 Horizontal controlling portion
54 Vertical controlling portion
60 Image processing unit
62 Superimposing unit
64 Touch-panel display
65 Measurement controller
66 Input/output unit
68 Touch-pen
89 Wide-angle camera optical system

[FIG. 2]
54 Horizontal controlling portion
56 Vertical controlling portion
60 Image processing unit
64 Touch-panel display

[FIG. 9]

Start
S0 Displaying image in wide-angle camera optical system
S1 Pointing out point of measurement on an image by wide-angle camera optical system
S2 Detecting position at the pointed-out point of measurement
S3 Operation of controlling portion
S4 Illumination light turned on. Detecting position of target at point of measurement
S5 Operation of controlling portion
S6 Zooming up
S7 Illumination light source turned on. Detecting position of target at point of measurement
S8 Operation of controlling portion
S9 Zooming at maximum?
S10 Illumination light source turned on. Measuring distance based on size of a target on display
S11 Adjusting collimation axis direction
S12 Change to collimation camera optical system
S13 Illumination light source turned on. Detecting position of target at point of measurement
S14 Operation of controlling portion
S15 Distance measurement and focusing control
S16 Illumination light source turned on. Detecting position of target at point of measurement
S17 Operation of controlling portion
S18 Target on collimation axis?

S19 Illumination light source turned off. Distance and angle measurement END

The invention claimed is:

1. An automatic collimation surveying apparatus having an image pick-up device for picking up an object to be measured, which is captured by a telescope, comprising:
a display for displaying an image picked up by said image pick-up device;
an image processing unit for discriminating a point of measurement from said image;
means for pointing out the point of measurement on said image; and
an automatic collimation unit for automatically collimating a pointed-out point of measurement, wherein said automatic collimation unit includes an image pick-up device installed in said telescope in order to pick up a target of said point of measurement,
a cross shaped line sensor installed in said telescope, into which illumination light reflected by said point of measurement is made incident,
a spare collimation device to pick up said target of said point of measurement.

2. The automatic collimation surveying apparatus as set forth in claim 1, wherein said display is a touch-panel display, and a point of measurement can be pointed out by touching the point of measurement on said image by said point-of-measurement pointing out means.

3. The automatic collimation surveying apparatus as set forth in claim 1, wherein the apparatus is connected to a peripheral mensuration controller provided with an image display.

4. The automatic collimation surveying apparatus as set forth in claim 1, wherein
said telescope includes a collimation camera optical system of high magnification, and a wide-angle camera optical system having a wide angle of view.

5. The automatic collimation surveying apparatus as set forth in claim 1, wherein an illumination unit that emits illumination light of visible light is provided on the same axis as a collimation axis.

6. The automatic collimation surveying apparatus as set forth in claim 5, including a distance measuring portion for measuring a distance to an object to be measured, and an angle measuring portion for measuring an angle thereof, wherein said distance measuring portion measures a distance only when said illumination light is turned off.

7. The automatic collimation surveying apparatus as set forth in claim 5, wherein said pick-up device, said light illumination unit, and optical system of said distance measuring portion are constructed as a coaxial optical system.

8. The automatic collimation surveying apparatus as set forth in claim 5, wherein said light illumination unit includes a light source that flickers at an appointed interval.

9. A method for surveying employing an automatic collimation surveying apparatus having an image pick-up device for picking up an object to be measured, comprising:
displaying an image picked up by said image pick-up device;
discriminating a point of measurement from said image;
pointing out the point of measurement on said image; and
collimating, by an automatic collimation unit, a pointed-out point of measurement,
wherein said automatic collimation unit comprises an image pick-up device installed in a telescope to pick up a target of said point of measurement, a cross-shaped line sensor installed in said telescope, into which illumination light reflected by said point of measurement is made incident, and a spare collimation device to pick up said target of said point of measurement.

* * * * *